(12) United States Patent
Bolton et al.

(10) Patent No.: US 10,825,164 B1
(45) Date of Patent: Nov. 3, 2020

(54) IMAGING SYSTEM FOR ANALYSIS OF WOOD PRODUCTS

(71) Applicant: Boise Cascade Company, Boise, ID (US)

(72) Inventors: David Bolton, Lena, LA (US); Jude Richard Peek, Pineville, LA (US); Curtis Fennell, Boyce, LA (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 16/205,027

(22) Filed: Nov. 29, 2018

Related U.S. Application Data

(60) Provisional application No. 62/595,489, filed on Dec. 6, 2017.

(51) Int. Cl.
| | |
|---|---|
| *G06T 7/00* | (2017.01) |
| *H04N 5/247* | (2006.01) |
| *G06T 7/90* | (2017.01) |
| *H04N 9/04* | (2006.01) |
| *G06T 7/70* | (2017.01) |
| *G06T 3/60* | (2006.01) |
| *G06T 3/20* | (2006.01) |
| *G06T 7/60* | (2017.01) |

(52) U.S. Cl.
CPC .............. *G06T 7/001* (2013.01); *G06T 7/90* (2017.01); *H04N 5/247* (2013.01); *G06T 3/20* (2013.01); *G06T 3/60* (2013.01); *G06T 7/60* (2013.01); *G06T 7/70* (2017.01); *G06T 2207/10024* (2013.01); *G06T 2207/30161* (2013.01); *H04N 9/04* (2013.01)

(58) Field of Classification Search
None
See application file for complete search history.

(56) References Cited

U.S. PATENT DOCUMENTS

| | | | | |
|---|---|---|---|---|
| 5,892,808 | A * | 4/1999 | Goulding | ............. G01N 23/046 378/58 |
| 5,960,104 | A * | 9/1999 | Conners | ............. G01N 21/8986 144/402 |
| 2005/0161118 | A1* | 7/2005 | Carman | .................... B07C 5/14 144/403 |

OTHER PUBLICATIONS

Cognex Vision Software "GigE Vision Cameras User's Guide"; Published 2011; 9 pages.
Cognex "Vision Controller Installation Manual"; 2014; 56 pages.
Cognex "Vision Product Guide"; 2018; 12 pages.
USNR Transverse High Grader information sheet; Copyright 2019; retrieved May 23, 2019 from May 23, 2019 from https://www.usnr.com/en/product/THGLM; 1 page.

(Continued)

*Primary Examiner* — Lindsay J Uhl
(74) *Attorney, Agent, or Firm* — Hawley Troxell Ennis & Hawley LLP; Philip McKay

(57) ABSTRACT

A black and white image of a wood product, such as a veneer sheet, is captured with a first camera and a color image of the wood product is captured with a second camera. Computer processing of the black and white image is performed to determine dimensions of the wood product, the existence of voids within the wood product, and the presence of debris on the wood product. Computer processing of the color image is performed to determine whether colored defects are present in the wood product. A grade is assigned to the wood product based on this computer processing. The wood product can then be sorted based on the grade.

22 Claims, 18 Drawing Sheets

(56) References Cited

OTHER PUBLICATIONS

USNR Lineal High Grader information sheet; Copyright 2019; retrieved May 23, 2019 from https://www.usnr.com/en/product/LHGLM; 3 pages.

USNR LHG E-Valuator Module; Copyright 2019; retrieved May 23, 2019 from https://www.usnr.com/en/product/LHGEValuatorLM; 2 pages.

USNR Planer/Dry Mill Optimization information sheet; Copyright 2019; retrieved May 23, 2019 from https://www.usnr.com/en/product/mktoptplanermill1m; 1 page.

Mecano Advantages information sheet; Copyright 2019; retrieved May 23, 2019 from https://www.raute.com/mecano-advantages; 2 pages.

Mecano Solutions information sheet; Copyright 2019; retrieved May 23, 2019 from https://www.raute.com/mecano-solutions; 2 pages.

Mecano Products information sheet; Copyright 2019; retrieved May 23, 2019 from https://www.raute.com/264; 2 pages.

Drying Lines information sheet; Copyright 2019; retrieved May 23, 2019 from http://www.raute.com/mecano-drying-lines?redirect=http%3A%2F%2Fwww.raute.com%2Flvl%3Fp_id%3%26p_plifecycle%3D0%26p_p_state% . . . ; 2 pages.

Layup Lines information sheet; Copyright 2019; retrieved May 23, 2019 from https://www.raute.com/mecano-layup-lines; 1 page.

Veneer Handling Lines information sheet; Copyright 2019; retrieved May 23, 2019 from https://www.raute.com/mecano-veneer-handling-lines; 2 pages.

Panel Handling Lines information sheet; Copyright 2019; retrieved May 23, 2019 from https://www.raute/com/mecano-panel-handling-lines; 2 pages.

Peeling Lines information sheet; Copyright 2019; retrieved May 23, 2019 from https://www.raute.com/268; 1 page.

Smart Mill Concept information sheet; Copyright 2019; retrieved May 23, 2019 from https://www.raute.com/smart-mill-concept; 1 page.

\* cited by examiner

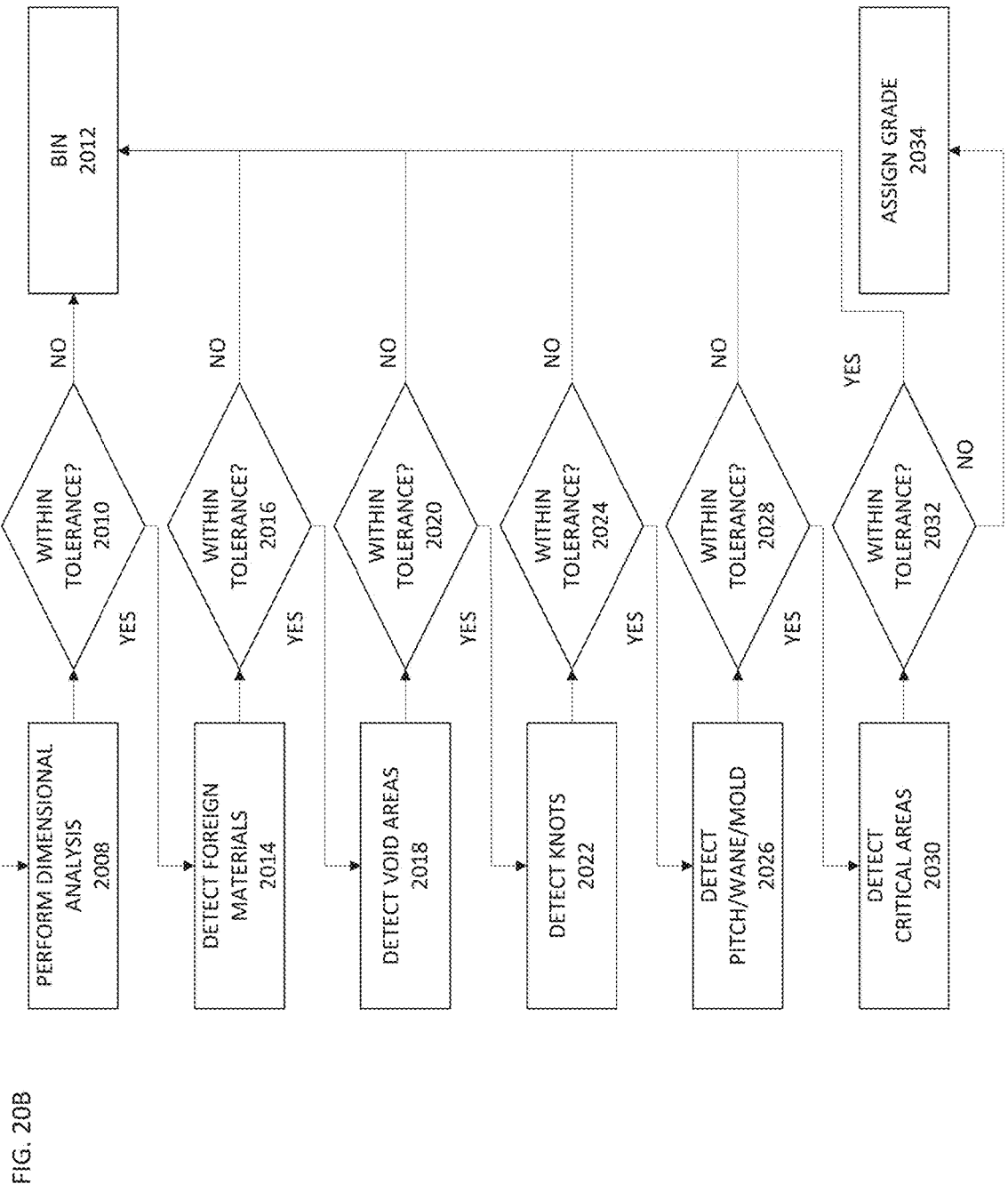

IMAGING SYSTEM FOR ANALYSIS OF WOOD PRODUCTS

CROSS REFERENCE TO RELATED APPLICATION

This application claims the benefit of U.S. Provisional Application No. 62/595,489, filed Dec. 6, 2017, which application is incorporated herein by reference in its entirety.

FIELD

This Application relates to grading of wood products including raw products such as logs, debarked blocks, green or dry veneer, and dimensional lumber, intermediate processed wood components such as wood I-beam flanges and webs, and finished goods comprising wood, such as laminated beams, I-joists, plywood panels, OSB (oriented strand board) panels, and OSL (oriented strand lumber) products.

BACKGROUND

Veneer is a common wood product that is commonly used in a wide variety of intermediate and finished wood based products for many commercial and industrial applications such as plywood, LVL (laminated veneer lumber), and wood I-beam products. Different intermediate processed components and finished goods utilizing wood veneer require veneer of varying physical characteristics as a component to produce a finished product of acceptable strength and visual acceptability. As such, it can be important to accurately and rapidly grade the quality of veneer sheets to determine what manufactured products the sheets are best suited for.

In some known prior art systems, veneer grading is performed using one line-scan camera that captures only a small portion of the length of the sheet of veneer. In these systems, a sheet of veneer is moved along a conveyor belt and a series of images are captured by the line-scan camera. Each captured image shows the entire width of the veneer sheet but only a small portion of the length of the sheet. These multiple images are then digitally stitched together lengthwise to form a composite image of the entire veneer sheet and the sheet is graded based on this composite image.

FIG. 1 shows a block diagram of one such line-scan system 100 for grading veneer. A sheet of veneer 102 is moved along conveyor 104 in direction 106 shown by the arrow. In the example of FIG. 1, the veneer sheet 102 is passed through an anti-skew device 108 on the way to the scanner 102 to attempt to align the sheet properly before any images are captured.

After the veneer sheet 102 passes through the anti-skew device 108, it passes through the field of view 110 of a line-scan camera (not shown) and a series of snapshots of the veneer sheet are captured by the camera. In order for these multiple images to be formed into a single composite image, the speed of the veneer sheet and the timing of when each image is captured must be accurately managed. In some systems, the camera can be triggered by an encoder driven by the conveyor mechanism that causes each image to be captured after the veneer sheet 102 has moved a certain distance. Any deviations can result in a less accurate composite image being generated.

FIGS. 2A-2C show various example composite images formed from multiple line-scans of a veneer sheet such as veneer sheet 102 of FIG. 1. FIG. 2A shows composite image 200 made up of snapshots 202, 204, 206, 208. In FIG. 2A, the snapshots are properly spaced and aligned and composite image 200 accurately shows the veneer sheet. FIG. 2B shows composite image 210 formed from snapshots 212, 214, 216, 218. FIG. 2B shows what can happen when the veneer sheet slips on the conveyor belt as it moves through the cameras field of view. In this example, the slippage caused the veneer sheet to be in the wrong position when snapshot 214 was taken, thereby presenting an inaccurate composite image when the individual snapshots are spliced together. FIG. 2C shows composite image 220 formed from snapshots 222, 224, 226, 228. In this example, the veneer sheet was misaligned when the images were captured, again resulting in an inaccurate composite image.

As discussed above and illustrated in FIGS. 2B and 2C, this type of prior art system can be error prone and lead to inaccurate images of veneer sheets being taken, which can result in the system improperly grading veneer sheets. Also, this process can slow down veneer grading.

A need exists for improved wood product scanning and grading equipment and methods.

SUMMARY

Embodiments of an imaging system for analysis of wood products are disclosed herein, as well as related methods of use. These embodiments can improve the speed and accuracy of, for example, veneer grading.

In one representative embodiment, a method can comprise capturing a black and white image of a wood product with a first camera, capturing a color image of the wood product with a second camera, determining from computer processing of the black and white image one or more of the dimensions of the wood product, the existence of voids within the wood product, and the presence of debris on the wood product, determining from computer processing of the color image whether colored defects are present in the wood product, and assigning a grade to the wood product based at least in part on the computer processing of the black and white image and the computer processing of the color image.

In some embodiments, the colored defects can comprise one or more of the presence of closed knots, the position of closed knots, the size and spacing of closed knots, the presence of pitch, the size and position of pitch, the presence of wane, the size and position of wane, and the presence of blue mold.

In some embodiments, the wood product can travel along a conveyor of a production line and the first and second cameras can capture the black and white and color images of the wood product at a first location along the conveyor.

In some embodiments, the first camera can capture a black and white image of an entire surface of the wood product facing the first camera and the second camera can capture a color image of the entire surface of the wood product facing the second camera.

In some embodiments, the first camera can capture a black and white image of a portion of the wood product without digitally stitching together multiple images and the second camera can capture a color image of the portion of the wood product without digitally stitching together multiple images.

In some embodiments, the wood product can be assigned an associated void or undersized grade based on the determination from the computer processing of the black and white image that one or more of the dimensions of the wood product are undersized in comparison to a reference or that voids exist in the wood product. The wood product can be sorted based on this grade.

In some embodiments where an associated void or undersized grade has not been assigned to the wood product, a grade can be assigned to the wood product based on one or more of the presence of closed knots, the position, size and spacing of closed knots, the presence of pitch, the size and position of wane, the size and position of wane, and the presence of blue mold as determined from the computer processing of the color image. The wood product can be sorted based upon this grade. In some embodiments, the wood product can be a sheet of wood veneer.

In some embodiments, the computer processing of the black and white image can comprise performing a comparison between the black and white image and a reference image. In some embodiments, the computer processing of the color image can comprise performing a comparison between the color image and a reference image. In some embodiments, the computer processing of the color image can comprise comparing data of the color image to reference data.

In some embodiments, the method can comprise determining a scaling factor between the wood product and the black and white image based at least in part on known dimensions of a reference image.

In some embodiments, the method can comprise auto-rotating the black and white image such that it is parallel with respect to a reference direction before performing the computer processing of the black and white image and auto-rotating the color image such that it is parallel with respect to the reference direction before performing the computer processing of the color image.

In some embodiments, the method can comprise translating the black and white image such that it has the same horizontal spacing as a reference image before performing the computer processing of the black and white image and translating the color image such that it has same horizontal spacing as the reference image before performing the computer processing of the color image.

In some embodiments, the method can further comprise determining from computer processing of the color image whether critical areas containing multiple defects are present in the wood product.

In another representative embodiment, a method can comprise storing a plurality of first images of veneer sheets having a first grade in computer memory, storing a plurality of second images of veneer sheets having a second grade in computer memory, capturing a black and white image of a veneer sheet with a first camera, capturing a color image of a veneer sheet with a second camera, performing a first series of comparisons between the plurality of first images and the black and white image with a computer, performing a second series of comparisons between the plurality of second images and the black and white image with the computer, performing a third series of comparisons between the plurality of first images and the color image with the computer, performing a fourth series of comparisons between the plurality of second images and the color image with the computer, and assigning one of the first grade or the second grade to the wood product based at least in part on one or more of the first series of comparisons, the second series of comparisons, the third series of comparisons, and the fourth series of comparisons.

In another representative embodiment, a method can comprise capturing a black and white image of a wood product with a first camera, capturing a color image of the wood product with a second camera, auto-rotating the black and white image such that it has the same orientation as a reference image, auto-rotating the color image such that it has the same orientation as the reference image, translating the black and white image such that it has the same horizontal spacing as the reference image, translating the color image such that it has the same horizontal spacing as the reference image, determining from computer processing of the black and white image one or more of the dimensions of the wood product, the existence of voids within the wood product, and the presence of debris on the wood product, determining from computer processing of the color image whether colored defects are present in the wood product, and assigning a grade to the wood product based at least in part on the computer processing of the black and white image and the computer processing of the color image.

In some embodiments, the method can comprise determining a scaling factor between the wood product and one of the black and white image or the color image based at least in part on known dimensions of the reference image.

In some embodiments, the first camera can capture a black and white image of an entire surface of the wood product facing the first camera and the second camera can capture a color images of the entire surface of the wood product facing the second camera.

In some embodiments, the first camera can capture a black and white image of a portion of the wood product without digitally stitching together multiple images and the second camera can capture a color image of the portion of the wood product without digitally stitching together multiple images.

In another representative embodiment, an apparatus can comprise a first camera to capture a black and white image of a wood product, a second camera to capture a color image of the wood product, and a controller. The controller can perform computer processing of the black and white image to determine one or more of the dimensions of the wood product, the existence of voids within the wood product, and the presence of debris on the wood product. The controller can perform computer processing of the color image to determine whether colored defects are present in the wood product. The controller can assign a grade to the wood product based at least in part on the computer processing of the black and white image and the computer processing of the color image.

In some embodiments, the first and second cameras can be mounted above a conveyor of a production line in a position to capture respective black and white and color images of the wood product at a first location of the wood product along the conveyor.

In some embodiments, the first camera can be configured to capture a black and white image of an entire surface of the wood product facing the first camera and the second camera can be configured to capture a color image of the entire surface of the wood product.

In some embodiments, the controller can be configured to determine a scaling factor between the wood product and the black and white image based at least in part on known dimensions of a reference image.

In some embodiments, the first camera can be configured to capture a black and white image of an entire surface of the wood product facing the camera and the second camera can be configured to capture a color image of the entire surface of the wood product.

In some embodiments, the controller can be configured to auto-rotate the black and white image and the color image such that the black and white image and the color image have the same orientation as a reference image.

In some embodiments, the controller can be configured to translate the black and white image and the color image such that the black and white image and the color image are each oriented to match the orientation of the reference image.

The foregoing and other objects, features, and advantages of the invention will become more apparent from the following detailed description, which proceeds with reference to the accompanying figures.

BRIEF DESCRIPTION OF THE DRAWINGS

FIGS. 20A and 20B together form a flowchart showing exemplary operations of the exemplary imaging system of FIG. 3.

DETAILED DESCRIPTION

Veneer is a type of wood product that is manufactured into sheets. As they are manufactured, various defects may exist in the veneer sheets. Depending on the number and type of defects on a particular sheet of veneer, that sheet may be unsatisfactory for use in particular applications. Accordingly, sheets of veneer are typically graded following manufacture and the grade determines the value and the possible uses that a sheet of veneer is suitable for. Grading of veneer is typically automated and performed by machines. A grade assigned to a sheet of veneer can be used to determine its best use; for example, whether it is suitable as a face sheet for plywood, whether it is suitable for clipping and edge gluing to form a sheet, whether it is suitable for use in laminated wood beams, should be discarded, or suitable for other uses.

Figure 1:
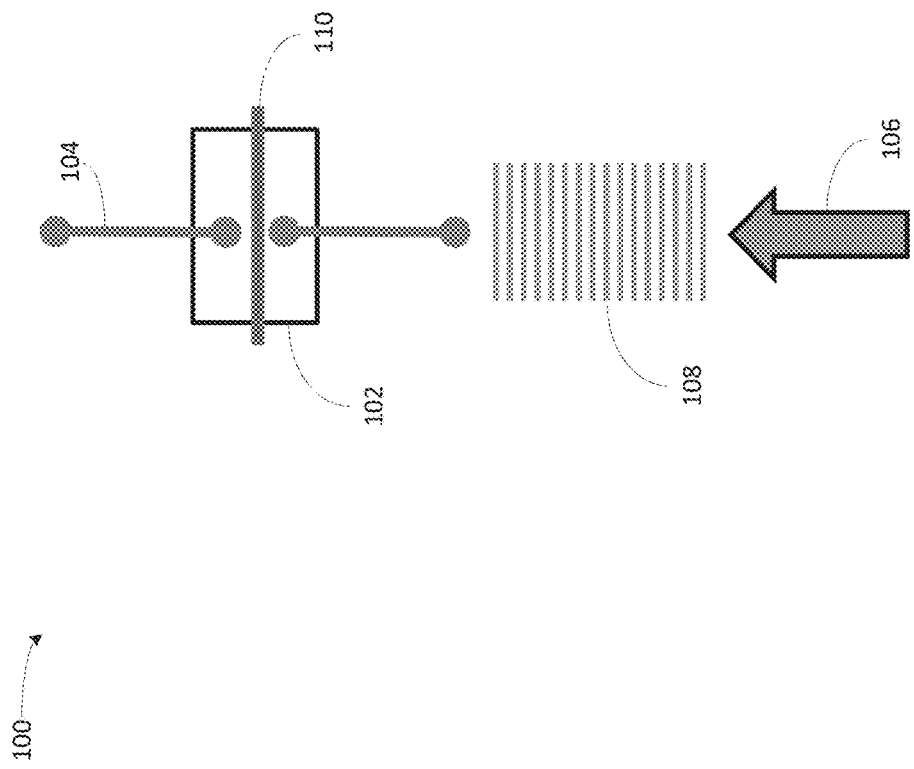
FIG. 1 shows a block diagram of a prior art system for grading veneer.
Figure 2:
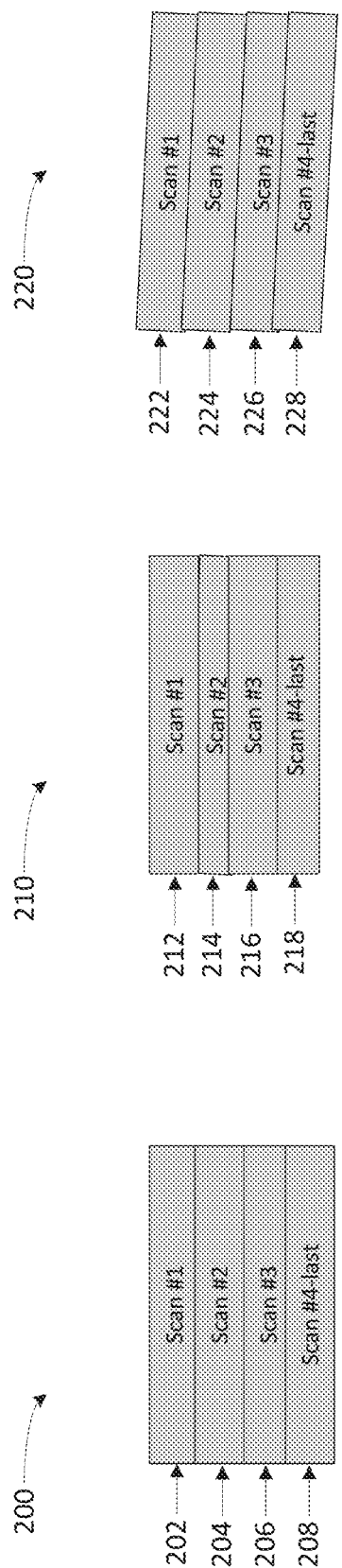
FIGS. 2A-2C show illustrations of a prior art line scan system.
Figure 3:
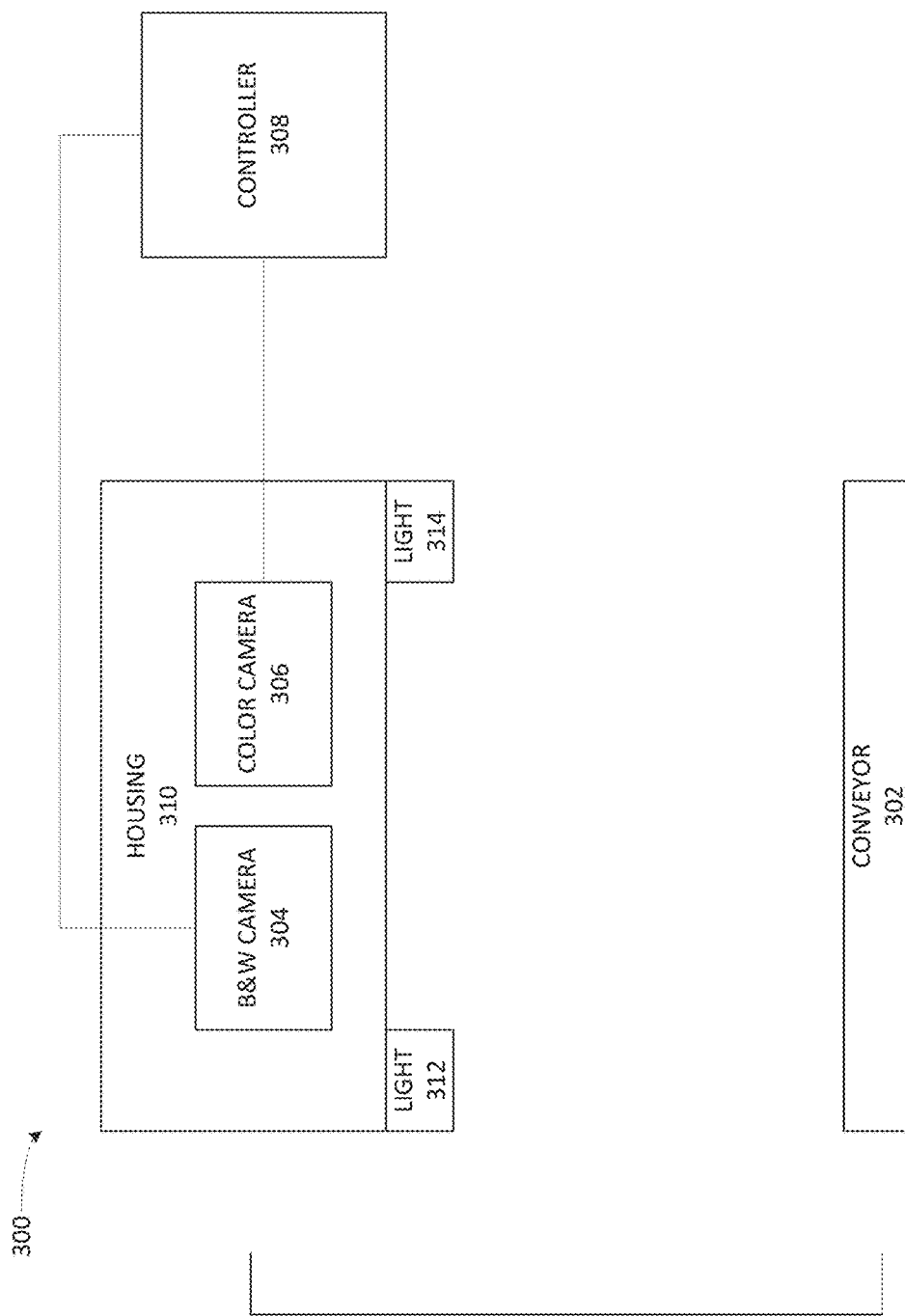
FIG. 3 shows a block diagram of an example of a new vision system for grading wood products such as veneer in accordance with this disclosure.
Figure 4:
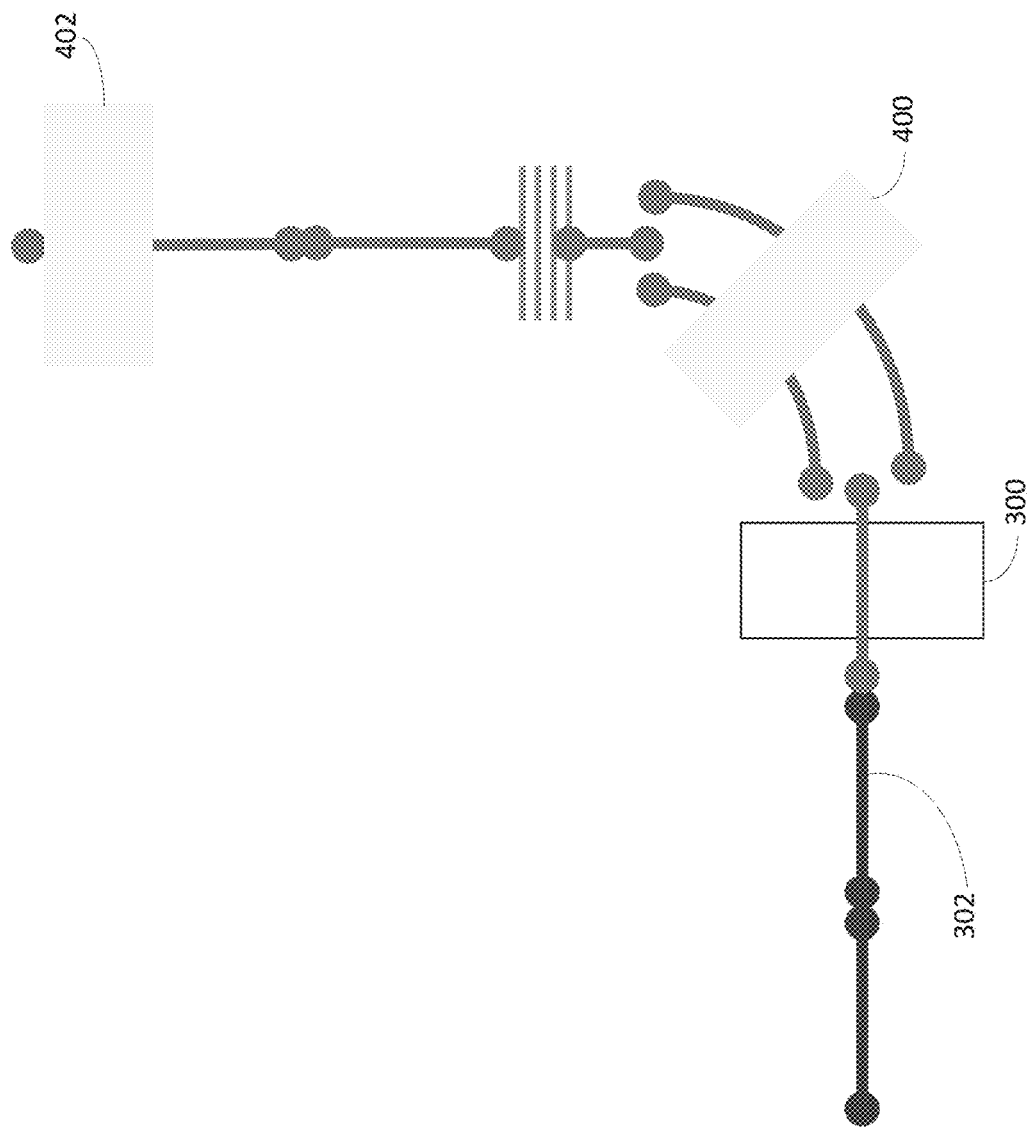
FIG. 4 shows a block diagram of an example conveyor for use with the vision system of FIG. 3.

FIG. 3 shows a block diagram of an imaging system 300 in accordance with this disclosure for grading veneer or other wood products such as logs, debarked blocks, dimensional lumber, finished products, intermediate products, I-beam flanges, I-beam webs, laminated beams, I-joist flanges, laminated veneer lumber, OSB, plywood, or laminated strand lumber according to one embodiment. In the example of FIG. 3, the imaging system 300 can grade veneer sheets or other wood materials as they move along a conveyor 302 of a production line, as shown in FIG. 4. For convenience, the focus of the description below is on the use of the system with veneer, without excluding the use in connection with other wood comprising products. FIG. 4 shows an overhead view of an example conveyor 302. The conveyor 302 can have any shape and can move sheets of veneer such as veneer sheets 400, 402 along its length using belts, a vacuum system, or any other mode of transporting the veneer sheets. In contrast to the line-scan system discussed above, a greater variety of veneer transporting options can be used with the conveyor 302. As veneer sheets are moved along by the conveyor 302, they pass under the imaging system 300 where they are graded as disclosed herein.

The imaging system 300 comprises both a black and white camera 304 and a color camera 306. Each camera desirably captures an area scan image of the entire area of the wood product, such as a veneer sheet, to be analyzed; which can be an entire surface area of the wood product or a portion thereof. As a result, desirably there is no need to stitch images together to form the entire area of the wood product to be analyzed. As used herein, the phrases "entire surface of a sheet facing a camera" or "entire surface of a wood product facing a camera means the entire surface of the sheet or wood product facing the camera and not including the sides thereof that are perpendicular to the surface facing the camera. Although stitching of images together can be performed using both color and black and white cameras in accordance with this disclosure, by capturing an area scan image, errors introduced from stitching together portions of an image to form a composite image are eliminated. In addition, capturing a single area scan of each veneer sheet or other wood product allows the imaging system 300 to operate at a higher rate of speed than veneer grading systems that use line scan technology since it takes longer to capture a series of line scans rather than a single area scan.

In some examples, the cameras 304, 306 can each capture an image of a portion of the veneer sheet to be analyzed and/or graded. This portion of the veneer sheet can be less than the entire sheet. In these examples, the black and white camera 304 and the color camera 306 can each capture an area scan of this entire portion of the veneer sheet without the need to digitally stitch together multiple line scans. The cameras 304, 306 can be positioned above a particular location along the conveyor such that they can capture respective black and white and color images of the veneer sheet as the sheet is moved by the conveyor past that location. In some examples, the cameras 304, 306 can be positioned below the conveyor, to the sides of the conveyor, or at various angles with respect to the conveyor. The cameras can be positioned at locations with respect to the conveyor to best view a particular material being graded.

The use of a plurality of cameras also allows for more accurate grading of veneer than is possible using only a single camera. In particular, black and white images can be used for, and are typically preferable for measuring the dimensions of a veneer sheet and identifying void areas within the sheet; while color images can be used for and are typically preferable for detecting defects on the surface of the sheet. By using both types of cameras to grade veneer sheets, the system 300 can take advantage of the defect detection strengths of each camera type. That is, the system 300 can use the black and white camera to detect certain defects of veneer sheets and the color camera to detect others. This improves the quality of veneer grading performed by the system 300. More than one of each type of camera can be used.

In some embodiments, infrared cameras can be used in addition to black and white and color cameras 304, 306 to capture heat signatures from veneer. In these embodiments, veneer temperature can be considered when assigning a grade to the veneer. In embodiments where a green veneer sheet is to be graded, infrared cameras can be used to measure temperature deviations on the sheet, which can be an indication of moisture content that can be used in sorting the sheet. In embodiments involving intermediate processes, infrared cameras can be used to measure the distribution of heat or whether an appropriate temperature for bonding to occur has been reached. Infrared cameras can also be used to monitor catalytic processes where heat is generated to determine if a process is within certain parameters (e.g., a desired ratio of resin and wood chips in OSB). Deviations from ideal parameters can indicate improper mix ratios or application issues, which can affect the strength of a finished product.

In some embodiments, cameras that can detect non-visible portions of the infrared spectrum can be used in addition to black and white and color cameras 304, 306. In these embodiments, "invisible" inks that are only visible when illuminated with certain wavelengths of light can be detected on marked panels.

Figure 22:
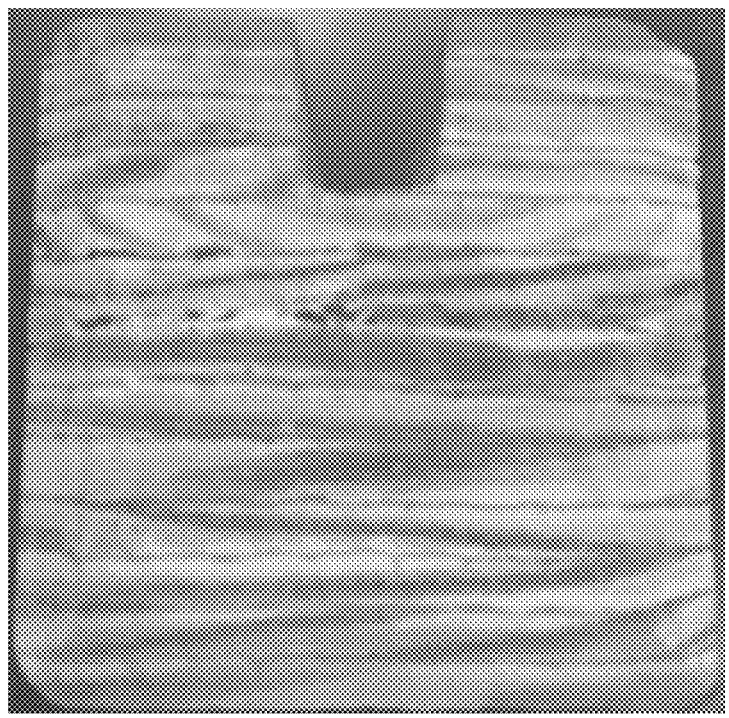
FIG. 22 shows an image of an example wood flange.

In some embodiments, a laser profiler can be used in addition to black and white and color cameras 304, 306. In these embodiments, the laser profiler can have a laser sensor to profile veneer to be analyzed. This can allow non-contact measurement of a thickness or other dimensions of veneer as long as the veneer is within the range of the laser profiler. A plurality of laser profilers used in combination can be used to create a three-dimensional image of veneer. This can be used for real-time monitoring of flange stock or other wood products that have multiple critical dimensions. An example of such a flange is shown in FIG. 22.

In some embodiments, a plurality of laser profilers and/or cameras can be used as part of a quality verification process to produce an image that can be compared to a reference image to determine if certain characteristics are within control parameters for a particular wood product. Such a quality verification process can also be used to measure deviations of control parameters from expected mean values as an indication of process trending. In some embodiments, multiple cameras can be used to simultaneously capture images of a wood product from multiple angles and/or directions.

Referring to FIG. 3, the cameras 304, 306 each have a certain field of view and these fields of view substantially overlap with each other and preferably entirely overlap one another in the region of the veneer sheet to capture the entire veneer sheet. As long as a veneer sheet is within the field of view of the respective cameras when the entire veneer sheet images are captured, an accurate grading of the veneer sheet can be accomplished. Additionally, because an image of the entire veneer sheet is captured, the orientation of the veneer sheet is not critical. In the example of FIG. 4, the cameras could be placed over the conveyor 302 at the location of veneer sheet 400, veneer sheet 402, or any other location along the conveyor, with one such placement of imaging system 300 being shown in FIG. 4. The cameras 304, 306 can be placed any distance above the conveyor 302 such that a veneer sheet moving along the conveyor easily fits within the field of view of each camera as the sheet passes under the cameras, regardless of the orientation of the veneer sheet.

Referring back to FIG. 3, the vision system 300 further comprises a controller 308 to control the operation of the cameras 304, 306 and to perform analysis of the images captured by the cameras to grade the veneer sheets that pass along the conveyor 302. In the illustrated example, the cameras 304, 306 can be Cognex GigE Vision cameras and the controller 308 can be a Cognex VC5 Vision Controller. In other examples, other cameras and controllers can be used that are capable of capturing images of veneer sheets and performing image analysis. In some examples, the controller 308 is a dedicated hardware device capable of performing the operations disclosed herein. The image analysis performed by the example vision system 300 is discussed in further detail below.

The vision system 300 further comprises a housing 310 to house the cameras 304, 306. The housing 310 can be attached to or suspended from a ceiling, or mounted to any type of structural support, such that the vision system 300 is positioned above the conveyor 302 and such that veneer sheets moving along the conveyor pass through the field of views of the cameras 304, 306. Lights 312 and 314 can be affixed to the lower end of the housing 310 to illuminate veneer sheets passing along the conveyor 302 such that images of the veneer can be captured by the cameras 304, 306. In the illustrated example, the lights 312 and 314 can be LED lights. In other examples, the lights 312, 314 can be any type of lighting capable of illuminating veneer sheets that pass along the conveyor 302 and can be mounted on supports other than the housing 310.

In operation, with reference to FIG. 4, sheets of veneer are moved along the conveyor 302 while the conveyor and the veneer sheets are illuminated by lights 312, 314. When a sheet of veneer is within the field of view of the respective cameras 304, 306, the camera 304 captures a black and white image of the veneer sheet and the camera 306 captures a color image of the veneer sheet. These images can be captured simultaneously if the veneer sheet is simultaneously in the field of view of both cameras. Alternatively, the images can be captured sequentially by one camera and then the other camera. After these images are captured, the controller 308 analyzes the images to determine a grade for the veneer sheet, as discussed below. This process is then repeated for any number of veneer sheets. This process can operate at a high rate of speed so long as the cameras 304, 306 each capture an image of each sheet of veneer that moves along the conveyor 302. In some examples, the conveyor 302 directs each veneer sheet to a different location based on its grade. In other examples, the result of the grading of each veneer sheet is stored for later use. In some embodiments, the controller 308 can also receive inputs from other devices such as a stress wave grader or a moisture scanner. In these embodiments, the controller 308 can use each of these additional inputs in combination with the visual information received from cameras 304, 306 to determine a grade for a veneer sheet.

To analyze a sheet of veneer after a black and white image and a color image are captured by cameras 304, 306, respectively, first the captured images can be and are desirably auto-rotated so that the images are properly oriented. Because the cameras 304, 306 capture an area scan of the veneer sheet, the sheet need not be oriented perfectly parallel with respect to the cameras when the images are captured, which is one of the advantages of using area scans rather than line scans. Auto-rotating the images such that the image of the veneer sheet is oriented parallel with respect to a reference direction facilitates further analysis and comparison to reference images. In some examples, the black and white and color images are auto-rotated such that they have the same orientation as a reference image. In another example, a reference image can be auto-rotated to match the orientation of the images captured by the cameras 304, 306, without rotating the captured images.

After this auto-rotation is performed, the images can be translated such that they are properly centered, with respect to one another. That is, the images are digitally overlapped on top of one another such that the same portion of the sheet captured by each camera is registered (overlaid) in a composite view and the images have the same horizontal spacing. This is desirable in one embodiment where the cameras 304 and 306 are offset from each other at the time the images are captured, such as horizontally offset on the housing 310. As such, the veneer sheet will be off to one side of the image captured by camera 304 and off to the other side of the image captured by camera 306. Translating each of these images in a complementary direction assures that both images can be compared to a centered reference image.

Once these initial steps are performed, if needed, the images can be analyzed to grade the veneer. As discussed above, the black and white image can be used to analyze certain defects of the veneer sheet while the color image can be used to analyze other defects of the veneer. In particular, black and white images can desirably be used to measure dimensional issues, such as the size of a veneer sheet and void areas on the sheet. For detecting this type of defect, the imaging system need only determine whether or not material is present and the use of a black and white image is preferable for this. Alternatively, differentiating between colors is key to detecting surface defects such as pitch and mold. Accordingly, color images can desirably be used to detect this type of colored defect. The specific defects that are measured with each camera are discussed below.

In some examples, the controller 308 utilizes a learning algorithm software to "learn" to grade veneer sheets over time. In these examples, several images of veneer sheets having a first grade and several images of veneer sheets having a second grade, e.g. as determined by manual grading, can be stored in computer memory and analyzed by the learning algorithm software executed by a computer. The software can then determine what features of the images differentiate the different grades of sheets. Then, when an image or images of a new veneer sheet is analyzed by the software, the features of this new sheet can be compared to the learned features to determine a grade of the new veneer sheet.

In some examples, a reference image is stored in computer memory showing an ideal veneer sheet and as images are captured of veneer sheets to be graded, the images are compared to the reference image. In these examples, veneer sheets can be graded based on differences between the captured images and the reference image. In some examples, multiple reference images are stored corresponding to different grades of veneer and veneer sheets are assigned a grade based on which reference image a veneer sheet most closely resembles.

In some examples, the controller 308 can perform computer processing of a captured black and white and/or color image of a veneer sheet to assign a grade to the veneer sheet. Computer processing of an image can comprise one or more of the following actions: comparing the image to a reference image, comparing data from the image to reference data, comparing data of the image to certain parameters, using image processing tools to detect features in the image. Alternative computer processing approaches can also be used.

In one example, a captured image of a veneer sheet to be graded (e.g., a black and white image) can be compared to a reference image to establish a scaling factor. That is, if the dimensions of the reference image are known, then the controller 308 can compare the reference image to the captured image to determine the actual distance that each pixel of the reference image and the captured images corresponds to. Once this scaling factor is determined, the dimensions of the veneer sheet can be determined by overlaying the captured black and white image on the reference image and determining the differences (e.g., missing material on the captured image compared to the reference image). Based on this comparison, the controller 308 can determine the length and width of the veneer sheet, as well as determine how sharp the corners are (for example, if a corner of the sheet is missing). In some examples, the dimensional analysis can be done without directly comparing the captured image to the reference image but instead by using the scaling factor and analyzing the captured image directly to determine the length and width of the veneer sheet and the sharpness of the corners. In some examples, the controller 308 determines the scaling factor once for a particular type of product and uses this scaling factor every subsequent time that this product is graded. If the cameras are not moved, or the camera lenses are unchanged, the scaling factor would remain the same every time the same type of product is graded, but could change for different products having different thicknesses. In some examples, the scaling factor can be determined manually (e.g., by analyzing the geometry and placement of the lenses of the cameras 304, 306 with respect to the veneer sheet when the images are captured).

Simultaneously, before, or after, and more desirably after, the dimensions of the veneer sheet are determined by processing the black and white image, a color image of the veneer sheet can be analyzed by the controller 308 to determine additional defects in the veneer sheet as discussed below. In some examples, the color image is first converted to greyscale before it is analyzed to determine defects in the veneer sheet.

The controller 308 can use a variety of image processing tools to determine these defects. For example, the controller 308 can detect geometric circles which correspond to closed knots and a blob tool can be used to look for irregular shapes on the veneer sheet indicative of the presence of pitch. Any number of such tools can be run simultaneously or concurrently to determine any number of defects. Depending on the analysis to be performed for the particular veneer sheet, different tools can be used to analyze the veneer sheet. For example, a veneer sheet to be used for one particular purpose might be analyzed using different tools than the tools used to analyze a veneer sheet to be used for a different purpose.

The controller 308 can be programmed with certain parameters to be used by the various image processing tools to detect various defects. In some examples, a machine learning algorithm can be used to help determine these parameters. In these examples, a first set of images that have a certain grade (e.g., G1 as determined by manual grading) can be input to the controller 308. Then, a second set of images having a different grade (e.g., G2 as determined by manual grading) can be input to the controller 308. This can be continued for any number of images having any number of different grades. The controller 308 can then use these images and their assigned grades as training data for a machine learning algorithm to determine the optimal parameters to be used with certain image processing tools to determine a grade for veneer sheets. Once these parameters are determined, the controller 308 can use the determined parameters with the image processing tool analyze captured images of veneer sheets and determine grades for the veneer sheets.

Discussed below are different types of defects that can be found in veneer sheets and that can be detected and/or measured by the imaging system 300 using images captured by either the black and white camera 302 or the color camera 304. Also discussed below are parameters that can be measured for these defects (i.e., measurable deviations from an ideal veneer sheet). In some examples, the imaging system 300 determines whether or not each detected defect is within an acceptable range. In other examples, the imaging system 300 determines a magnitude of deviation of one or more parameters from an ideal veneer sheet in order to grade the veneer. In these examples, the imaging system 300 can use a combination of detected defects to determine a grade for veneer and/or whether or not a sheet of veneer is acceptable for a particular purpose. In some examples, a magnitude of deviation can be determined as a percentage difference from a desired value. In other examples, a magnitude of deviation can be determined as an absolute value of a difference from a desired value. In some examples, the imaging system 300 can monitor the trend of a certain value over time. For example, if dimensional offsets are increasing, this provides an indication of upstream problems in equipment used with the veneer.

In the examples discussed below, acceptable ranges for certain defects are given. These ranges correspond to exemplary ranges that make veneer sheets acceptable for one particular application. For other applications, other ranges could be used to define what is acceptable. Furthermore, in the illustrated example of FIG. 3, the controller 308 can be programmable such that acceptable ranges for various defects can be programmed into the controller for any given application.

Figure 5B:
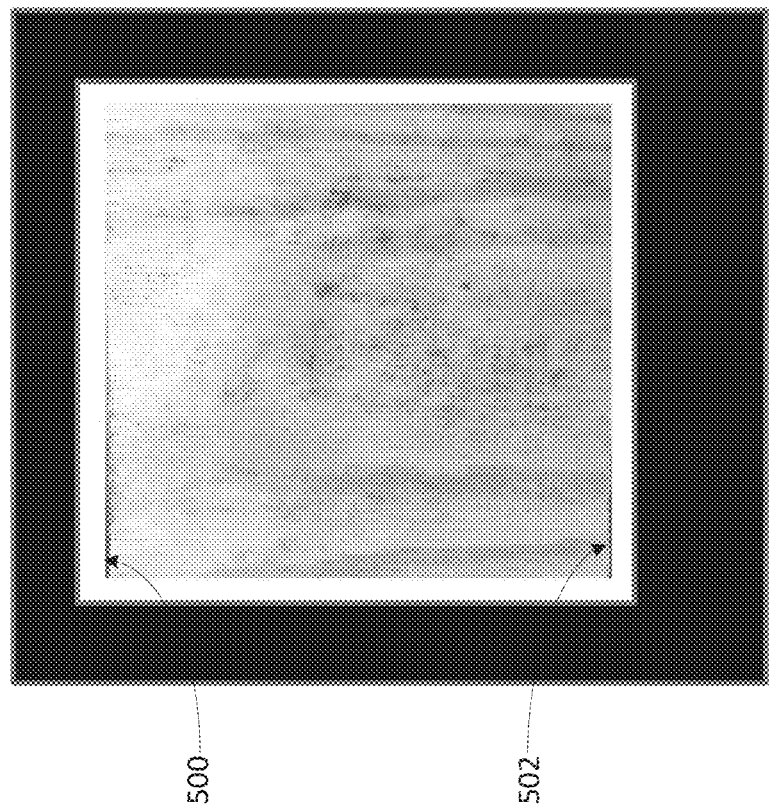
FIG. 5B shows an example image of a veneer sheet with dimensional discrepancies.
Figure 5A:
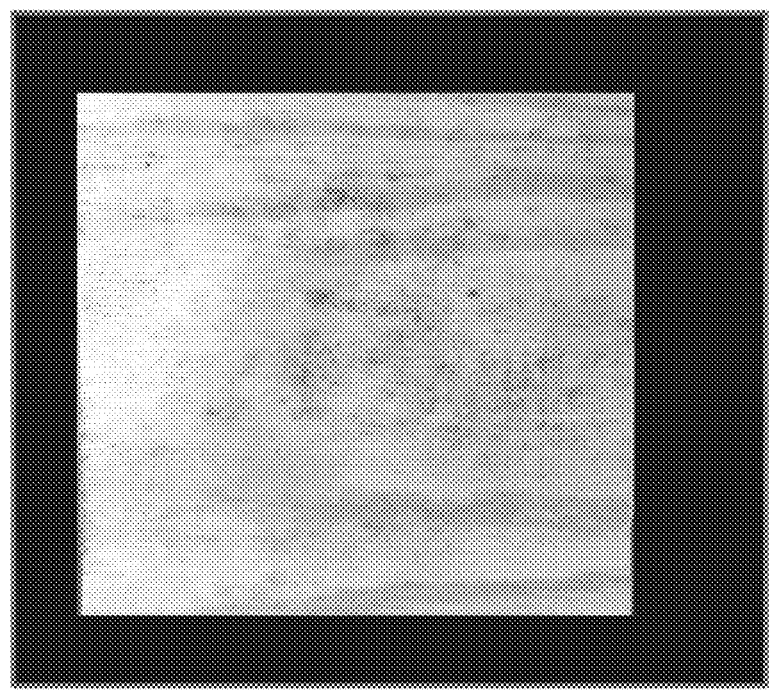
FIG. 5A shows a reference veneer sheet without any dimensional discrepancies.

FIGS. 5A-5B illustrate a dimensional analysis that can be performed by the example imaging system 300. FIG. 5A shows an image of an ideal veneer sheet and FIG. 5B shows an image of a veneer sheet that has dimensional discrepancies in corners 500 and 502, wherein the veneer sheet is undersized. This is a type of defect that can be best detected from a black and white image. In the illustrated example, the acceptable width of a veneer sheet can be, for example, between 49.75 inches and 51.5 inches with an ideal mean width of 50.5 inches for use in four foot wide plywood sheets. In some examples, the controller 302 calculates a deviation in magnitude between the mean width and the actual width of a veneer sheet in order to determine a grade for the sheet. Additionally, detecting deviations from the mean width that are increasing over time but still within the acceptable range can allow personnel to become aware of a veneer manufacturing problem and correct it before deviations from the acceptable range are exceeded. In some examples, dimensional analysis can be performed by counting a number of pixels in a certain area within a certain range of values.

Similar measurements can be performed with respect to the length of a veneer sheet. In the illustrated example, the minimum acceptable length can be 101.75 inches (for example, a veneer sheet to be used as a face sheet in four foot by eight foot plywood) and there is no maximum required length as any excess material can be removed as waste.

Another defect that can be detected by the example imaging system 300 from black and white images is the shape of a veneer sheet and how close it is to a rectangle. In the illustrated example, acceptable deviations from a rectangular shape are no more than ¾ of an inch measured diagonally across a sheet. In some examples, the controller 302 calculates the magnitude of deviation from a perfectly rectangular shape. Deviations above the allowable limit can contribute to edge defects in finished products.

Figure 6:
FIG. 6 shows an image of a veneer sheet with a broken corner.

Another defect that can be detected by the example imaging system 300 from black and white images is misshapen corners. In an illustrated example, each of the corners of a veneer sheet must be a right triangle, such as being a right triangle with a minimum of 6 inch base dimensions. FIG. 6 shows a veneer sheet with a broken corner 600 that would not meet this criteria. Another defect that can be detected by the system 300 is the presence of more or less than four corners, which indicates a misshapen or damaged sheet.

Figure 7:
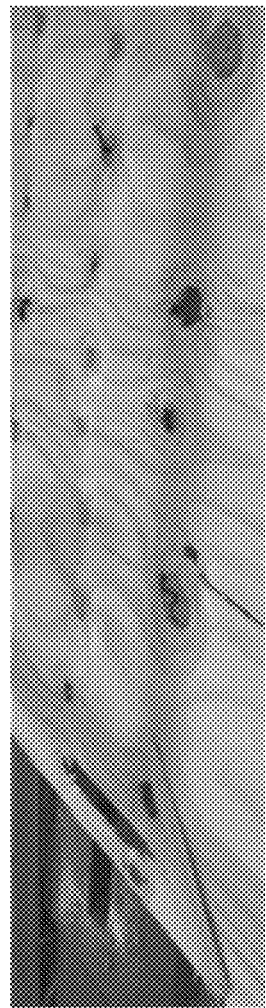
FIG. 7 shows an image of a veneer sheet with foreign material (an extraneous piece of veneer on top of the veneer sheet).

Another defect that can be detected by the example imaging system 300 from a black and white image is the presence of foreign materials or debris such as grease, paint, dirt, wood chips, etc. In one desirable example, no such foreign materials are allowable. FIG. 7 shows a veneer sheet with a wood chip 700 present on its surface.

Figure 8B:
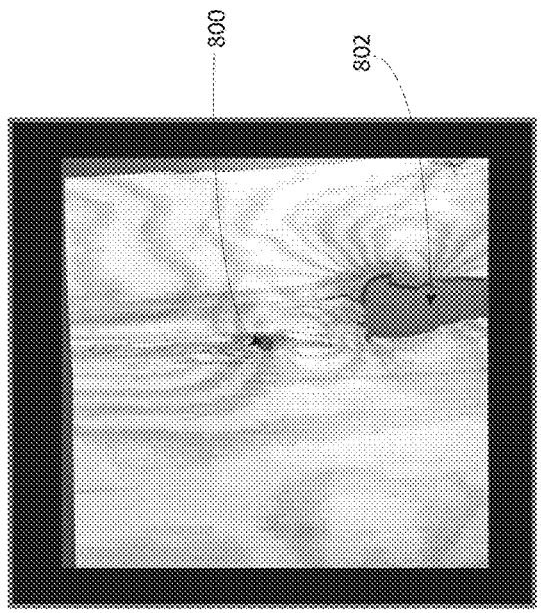
FIGS. 8B-8C show images of a veneer sheet with void spaces.
Figure 8C:
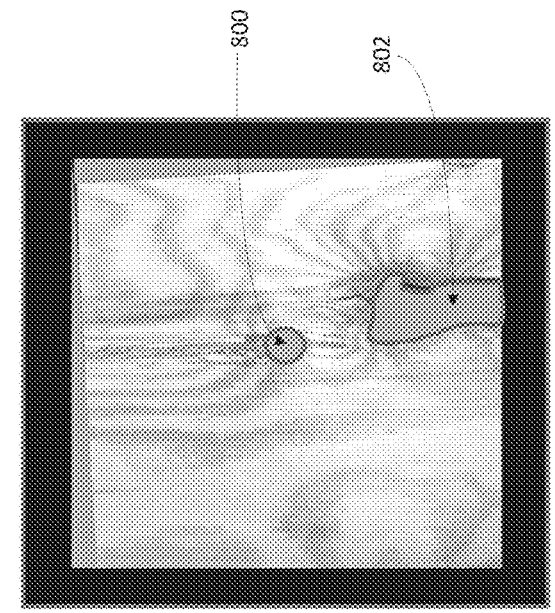
Figure 8A:
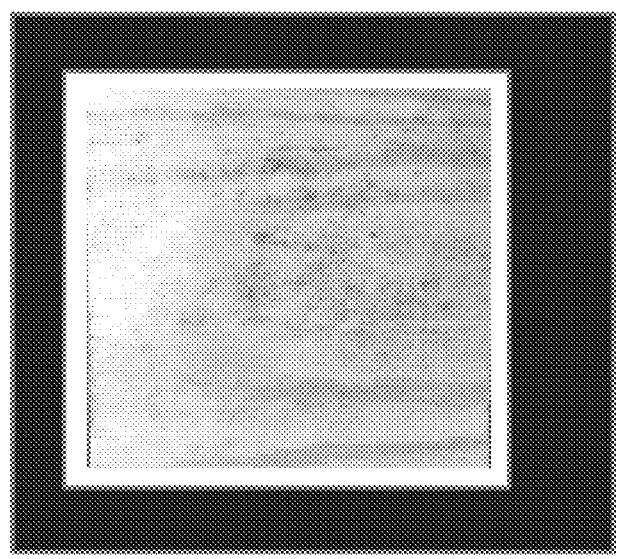
FIG. 8A shows a reference image of a veneer sheet without any void spaces.

Another defect that can be detected by the example imaging system 300 from a black and white image is void areas. Void areas can comprise open knots, broken, missing or irregular corners or boundary portions, splits, or any material missing from a sheet. FIG. 8A shows an image of a reference veneer sheet without any void areas while FIGS. 8B and 8C respectively show images of a veneer sheet having open knot 800 and broken out area 802.

Figure 9A:
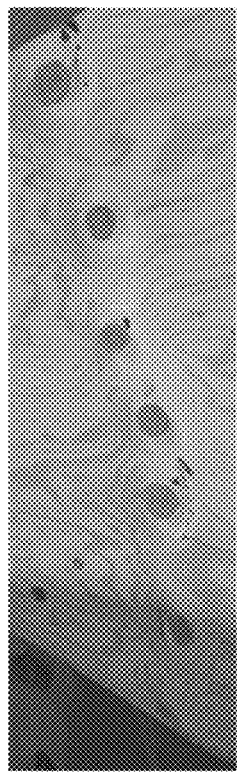
FIGS. 9A-9B show images of a veneer sheet with tight knots.
Figure 9B:

The remaining defects discussed below are defects in veneer sheets that the example imaging system 300 can desirably detect from color images. Closed knots are one such defect that can be detected by the imaging system. FIGS. 9A-9B show example veneer sheets with tight or closed knots. Tight knots are knots where there is no material missing within the knot perimeter. In one grading example, veneer sheets meeting this grade can have tight or closed knots that have a maximum allowable diameter of 3.5 inches. For loose knots, where a portion of the material within the perimeter of the knot is missing, in one grading example, the knot can have a maximum diameter of 3 inches. For any knots having a diameter greater than 2 inches, in one grading example, there must be a minimum spacing of 6 inches between knots across the sheet and there must be clear, straight grain with no additional defects in the space between the knots. The grading standards can vary for different grades of sheets.

Figure 10:
FIG. 10 shows an image of a veneer sheet with at least one split and tight knots.

Another defect that can be detected by the imaging system 300 is splits. FIG. 10 shows an example veneer sheet that has a split 1000. In one specific grading example, splits can have a maximum length of 24 inches, the maximum number of allowable splits is 6, and the total cumulative length of all splits in a veneer sheet cannot exceed 48 inches. Splits can be detected from both black and white and color images. In some examples, backlighting of a veneer sheet can be used to improve the contrast of captured images, such as to better detect splits or other defects.

Figure 11:
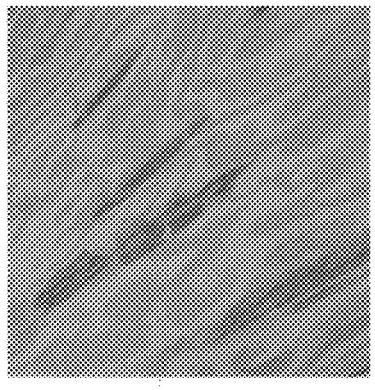
FIG. 11 shows an image of a veneer sheet containing pitch.

Another defect that can be detected by the imaging system 300 is pitch. FIG. 11 shows a veneer sheet that contains pitch 1100 on its surface. In one grading example, individual pitch pockets can have a maximum surface of 6 square inches and there can be at most 3 pockets per veneer sheet. In addition, pitch pockets must be separated by at least 24 inches and there must be clear, straight grain with no defects in the area between pitch pockets.

Figure 12:
FIG. 12 shows an image of a veneer sheet with wane.

Another defect that can be detected by the imaging system 300 is wane. FIG. 12 shows a veneer sheet with wane 1200. In one grading example, there can be at most 6 square inches of cumulative wane per sheet of veneer to meet the grade.

Figure 13:
FIG. 13 shows an image of a veneer sheet with light mold.
Figure 14:
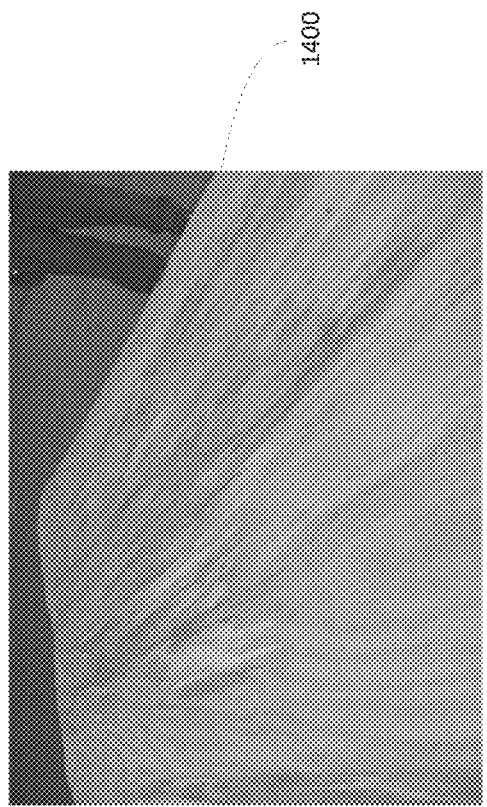
FIG. 14 shows an image of a veneer sheet with heavy mold.
Figure 15:
FIG. 15 shows an image of a veneer sheet with charring due to excessive heat.

Another defect that can be detected by the imaging system 300 is mold. FIG. 13 shows a veneer sheet that contains light mold. In one grading example, light mold with a transparency of greater than 85% is acceptable. Heavy mold, blue stain or significant discolorations where transparency is less than 85% is not acceptable in this example. FIGS. 14 and 15 show examples of veneer sheets with heavy mold 1400 and charring 1500 due to excessive heat, respectively.

Figure 16:
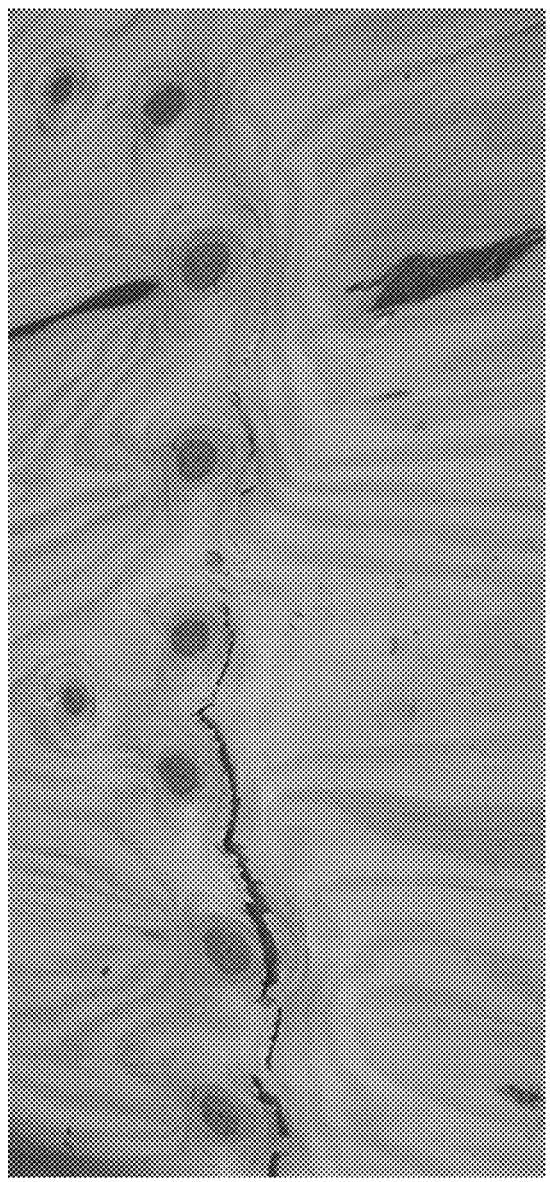
FIG. 16 shows an image of a veneer sheet with multiple defects of different types.

Another defect that the imaging system 300 can detect are critical areas where a cumulative collection of individual defects on a veneer sheet combine to compromise the quality of the veneer sheet. For example, FIG. 16 shows a veneer sheet with a crack across the sheets near closed knots and without 6 inches of clear straight grain space between the knots. This area can be considered a critical area with multiple defects.

Figure 17B:
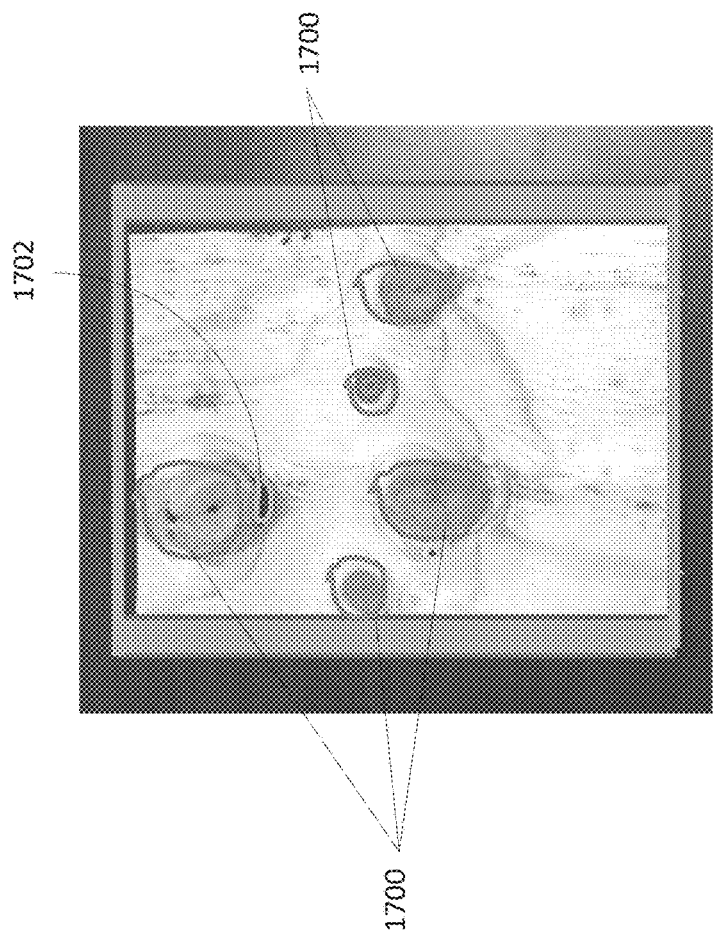
FIG. 17B shows a veneer sheet with knots and pitch.
Figure 17A:
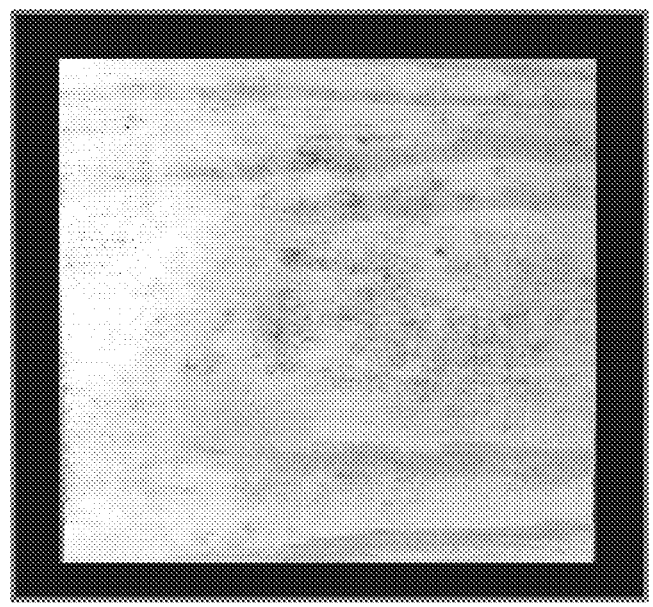
FIG. 17A shows a reference a veneer sheet without any knots or pitch.

FIGS. 17A-17B illustrate an example of how the imaging system can utilize color images to differentiate different types of defects. FIG. 17A shows a reference image, while FIG. 17B shows an image of a veneer sheet having both closed knots 1700 and pitch 1702. The deviations in color between the closed knots 1700 and the pitch 1702 allow the imaging system 300 to identify and differentiate these two types of defects. Furthermore, the darker the color of a knot in comparison to the reference image can be considered a reduction in material strength and can be considered when assigning a veneer grade based on a magnitude of deviation from the reference.

Figure 18:
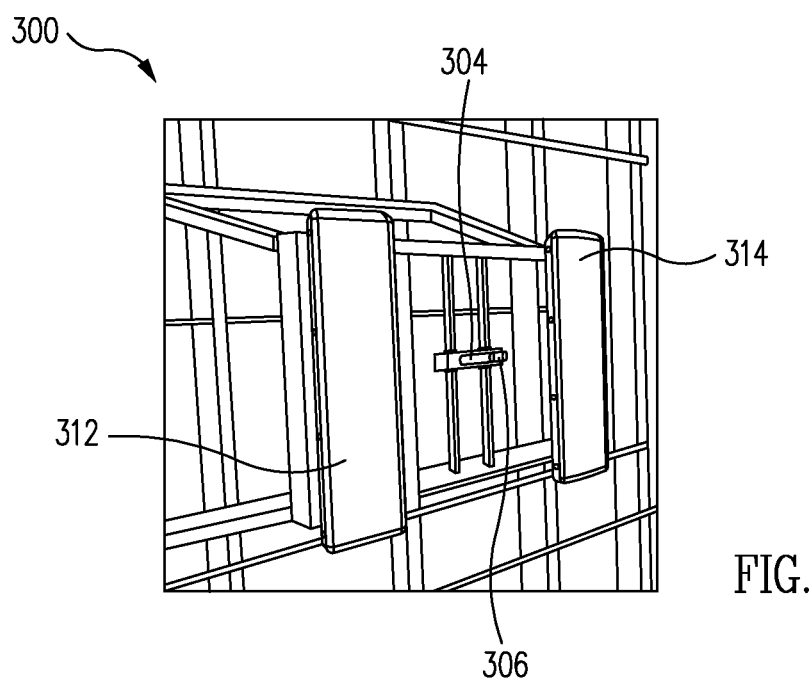
FIGS. 18-19 show images of an installation of the example imaging system of FIG. 3.
Figure 19:
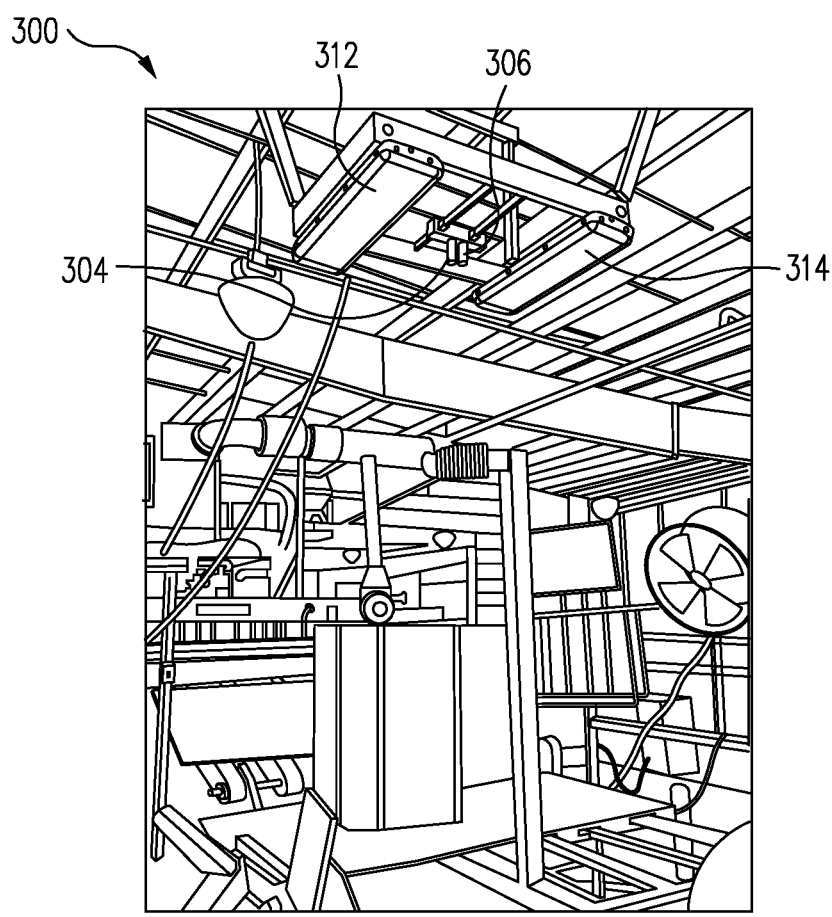

FIGS. 18-19 show various views of portions of an installation of a veneer imaging system 300 including lights 312, 314 and cameras, 304, 306.

In some examples, the imaging system 300 can determine a plurality of magnitudes of deviation from a reference image for each detected defect on a veneer sheet. In these examples, the various magnitudes of deviation can be combined to determine a grade for the sheet of veneer. For example, the imaging system may determine how many open knots are present, what the total size of the open knots is, and how far apart the open knots are separated and combine all these measures in determining a grade for the veneer sheet.

In some examples, the imaging system 300 first determines whether a veneer sheet has dimensions within the allowed parameters. If the dimensions are not within the allowed parameters, the sheet can be sent for further processing (e.g., composer or core feeder) or treated as scrap wood. If the dimensions are within the allowable parameters, then the other defects can be detected and/or measured and a grade for the veneer can be determined based on these detected defects. The veneer sheet can then be sorted based on the grade such that the sheet is used in the most cost-effective manner in a manufacturing process.

In some examples, the images of a veneer sheet captured by the cameras 304, 306 are stored along with the grade that the system 300 assigns to the veneer sheet and/or the defects in the sheet detected by the system 300. Then, the stored images can be later compared to the grade assigned or the defects found in the veneer sheet to determine if the system 300 is accurately detecting defects and assigning grades. If, for example, it is discovered that the system 300 is detecting defects in veneer sheets that are not actually present or if the system is not detecting certain defects, the settings of the system can be adjusted to improve future performance.

Figure 20A:
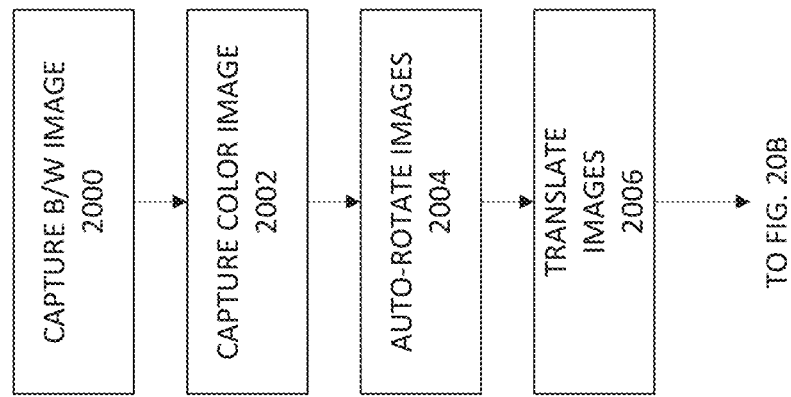

FIGS. 20A and 20B together show a flowchart representative of exemplary operations of the veneer imaging system 300. FIG. 20A begins when the black and white camera 304 captures an image of a veneer sheet to be graded (block 2000). The color camera 306 then captures an image of the same veneer sheet (block 2002). In some examples, the black and white camera and the color camera capture images of the veneer sheet simultaneously or in a different sequence.

After the black and white and color images of the veneer sheet are captured, these images are desirably auto-rotated and/or centered to match the orientation of a reference image as described above (block 2004). The black and white and color images are then desirably translated such that they are properly aligned with respect to each other as described above (block 2006). Dimensional analysis is then performed by comparing the black and white image to a reference image as described above (block 2008). If the dimensions of the veneer sheet are found to be outside of an allowable range (block 2010), then the veneer sheet is sent to a particular bin (e.g., a location to be further processed, discarded, used as scrap) or assigned some for some other purpose (block 2012). If the dimensions of the veneer sheet are found to be within the allowable range, then control advances to block 2014.

In block 2014, the imaging system determines whether any foreign materials are present on the veneer sheet as described above. If the amount of foreign materials are found to be outside of an allowable range (block 2016), then the veneer sheet is binned (i.e., sent to a particular bin). In some examples, this can be the same bin that the materials that failed the dimensional analysis in block 2010 were sent to. In other examples, this can be a different bin. In the example of FIG. 20, any number of bins can be present. If the amount of foreign materials around found to be within the allowable range (block 2016), then control advances to block 2018.

In block 2018, the imaging system detects void areas on the veneer sheet as described above. If the amount of void areas is found to be outside of an allowable range (block 2020), then the veneer sheet is binned. If the amount of void areas is within the allowable range, then control advances to block 2022.

In block 2022, the imaging system detects knots on the veneer sheet as described above. If the number and size of knots is found to be outside of an allowable range (block 2024), then the veneer sheet is binned. If the number and size of knots is found to be within the allowable range, then control advances to block 2026.

In block 2026, the imaging system detects pitch, wane, and mold on the veneer sheet as described above. If the amount of pitch, wane, and mold is found to be outside of an allowable range (block 2028), then the veneer sheet is binned. If the amount of pitch, wane, and mold is found to be within the allowable range, then control advances to block 2030.

In block 2030, the imaging system detects critical areas on the veneer sheet where a combination of defects degrade the quality of the veneer sheet as described above. If the number and severity of critical areas on the veneer sheet is found to be outside of an allowable range (block 2032), then the veneer sheet is binned. If the critical areas are found to be within the allowable range, then a grade is assigned to the veneer sheet based on all of the defects detected (block 2034). The example of FIGS. 20A-20B then ends.

In the example of FIGS. 20A-20B, each bin can be assigned to a different purpose. For example, one bin can be for scrap, one bin can be for use of veneer in plywood core, one bin can be for use as I-beam webs, with as many bins being provided as desired. The example of FIGS. 20A-20B shows one series of tests that can be performed. In other examples, any number any variety of tests can be performed in any order. After each test is performed, wood products that fail that particular test can be assigned to a particular bin. In some examples, the tests are performed in an order to detect veneer sheets from the lowest to highest quality. That is, if a veneer sheet fails a first test or set of tests (i.e., the detected parameters are outside of allowable levels), then the veneer sheet can be sent to a bin for the lowest quality veneer (i.e., scrap). If the first set of tests is passed but a subsequent test or set of tests is failed, then the veneer sheet can be sent to a bin for a slightly higher quality of veneer. This can continue any number of times. If a veneer sheet passes every test, then it can be assigned the highest quality grade.

It should be noted that translating the images from the color and black and white cameras is not required if the images are already aligned and overlap when taken. In addition, steps that are used in grading certain defects (e.g., dimensional defects) desirably determined from the black and white image can be performed prior to any translation step with the translation step eliminated if the analysis performed from the black and white image is sufficient to reject the sheet of veneer. However, the most efficient approach is to translate the image from the two cameras such that they overlap one another and then proceed with grading the veneer sheet.

Example Computing Systems

Figure 21:
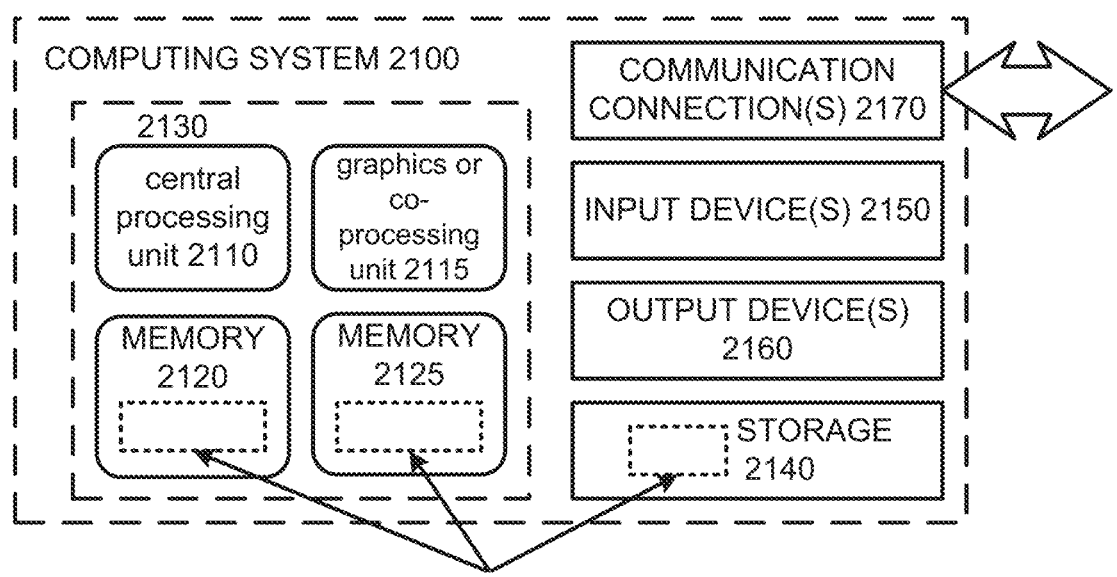
FIG. 21 is a diagram of an example computing system in which some described embodiments can be implemented.

FIG. 21 depicts a generalized example of a suitable computing system 2100 in which the described innovations may be implemented. The computing system 2100 is not intended to suggest any limitation as to scope of use or functionality, as the innovations may be implemented in diverse general-purpose or special-purpose computing systems.

With reference to FIG. 21, the computing system 2100 includes one or more processing units 2110, 2115 and memory 2120, 2125. In FIG. 21 this basic configuration 2130 is included within a dashed line. The processing units 2110, 2115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s). The memory 2120, 2125 stores software 2180 implementing one or more innovations described herein, in the form of computer-executable instructions suitable for execution by the processing unit(s).

A computing system may have additional features. For example, the computing system 2100 includes storage 2140, one or more input devices 2150, one or more output devices 2160, and one or more communication connections 2170. An interconnection mechanism (not shown) such as a bus, controller, or network interconnects the components of the computing system 2100. Typically, operating system software (not shown) provides an operating environment for other software executing in the computing system 2100, and coordinates activities of the components of the computing system 2100.

The tangible storage 2140 may be removable or non-removable, and includes magnetic disks, magnetic tapes or cassettes, CD-ROMs, DVDs, or any other medium which can be used to store information in a non-transitory way and which can be accessed within the computing system 2100. The storage 2140 stores instructions for the software 2180 implementing one or more innovations described herein.

The input device(s) 2150 may be a touch input device such as a keyboard, mouse, pen, or trackball, a voice input device, a scanning device, or another device that provides input to the computing system 2100. For video encoding, the input device(s) 2150 may be a camera, video card, TV tuner card, or similar device that accepts video input in analog or digital form, or a CD-ROM or CD-RW that reads video samples into the computing system 2100. The output device(s) 2160 may be a display, printer, speaker, CD-writer, or another device that provides output from the computing system 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 21, computer-readable storage media include memory 2120 and 2125, and storage 2140. The term computer-readable storage media does not include communication connections (e.g., 2170) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

I claim:

1. A method comprising:
    capturing a black and white image of an entire surface of a wood product with a first camera, wherein the first camera has a first field of view, and further wherein the first camera captures a black and white image of the wood product at a first location along a conveyor of a production line, the first location being within the first field of view;

capturing a color image of the entire surface of the wood product with a second camera wherein the second camera has a second field of view, the second field of view substantially overlapping with the first field of view, and further wherein the second camera captures a color image of the wood product at the first location, the first location being within the second field of view;

translating the black and white image from the first camera and the color image from the second camera such that the surface of the wood product captured by each camera is overlaid in a composite view and the images have the same horizontal spacing;

determining from computer processing of the black and white image one or more of the dimensions of the wood product, the existence of voids within the wood product, and the presence of debris on the wood product;

determining from computer processing of the color image whether colored defects are present in the wood product; and assigning a grade to the wood product based at least in part on the computer processing of the black and white image and the computer processing of the color image.

2. A method according to claim 1, wherein the colored defects comprise one or more of the presence of closed knots, the position of closed knots, the size and spacing of closed knots, the presence of pitch, the size and position of pitch, the presence of wane, the size and position of wane, and the presence of blue mold.

3. A method according to claim 1, wherein the first camera captures a black and white image of a portion of the wood product without digitally stitching together multiple images and the second camera captures a color image of the portion of the wood product without digitally stitching together multiple images.

4. A method according to claim 1, wherein based on the determination from the computer processing of the black and white image that one or more of the dimensions of the wood product are undersized in comparison to a reference or that voids exist in the wood product, the wood product is assigned an associated void or undersized grade and sorted based on this grade.

5. A method according to claim 1, wherein, if an associated void or undersized grade has not been assigned to the wood product:
based on the determination from the computer processing of the color image, a grade is assigned to the wood product based on one or more of the presence of closed knots, the position, size and spacing of closed knots, the presence of pitch, the size and position of pitch, the presence of wane, the size and position of wane, and the presence of blue mold; and
the wood product is sorted based upon this grade.

6. A method according to claim 1, wherein the wood product is a sheet of wood veneer.

7. A method according to claim 1, wherein the computer processing of the black and white image comprises performing a comparison between the black and white image and a reference image.

8. A method according to claim 1, wherein the computer processing of the color image comprises performing a comparison between the color image and a reference image.

9. A method according to claim 1, wherein the computer processing of the color image comprises comparing data of the color image to reference data.

10. A method according to claim 1, further comprising determining a scaling factor between the wood product and the black and white image based at least in part on known dimensions of a reference image.

11. A method according to claim 1, further comprising auto-rotating the black and white image such that it is parallel with respect to a reference direction before performing the computer processing of the black and white image and auto-rotating the color image such that it is parallel with respect to the reference direction before performing the computer processing of the color image.

12. A method according to claim 1, further comprising translating the black and white image such that it has the same horizontal spacing as a reference image before performing the computer processing of the black and white image and translating the color image such that it has the same horizontal spacing as the reference image before performing the computer processing of the color image.

13. A method according to claim 1, further comprising determining from computer processing of the color image whether critical areas containing multiple defects are present in the wood product.

14. A method comprising:
storing a plurality of first images of veneer sheets having a first grade in computer memory;
storing a plurality of second images of veneer sheets having a second grade in computer memory;
capturing a black and white image of an entire surface of a wood product with a first camera, wherein the first camera has a first field of view, and further wherein the first camera captures a black and white image of the wood product at a first location along a conveyor of a production line, the first location being within the first field of view;
capturing a color image of the entire surface of the wood product with a second camera wherein the second camera has a second field of view, the second field of view substantially overlapping with the first field of view, and further wherein the second camera captures a color image of the wood product at the first location, the first location being within the second field of view;
translating the black and white image from the first camera and the color image from the second camera such that the same portion of the wood product captured by each camera is overlaid in a composite view and the images have the same horizontal spacing;
performing a first series of comparisons between the plurality of first images and the black and white image with a computer;
performing a second series of comparisons between the plurality of second images and the black and white image with the computer;
performing a third series of comparisons between the plurality of first images and the color image with the computer;
performing a fourth series of comparisons between the plurality of second images and the color image with the computer; and
assigning one of the first grade or the second grade to the wood product based at least in part on one or more of the first series of comparisons, the second series of comparisons, the third series of comparisons, and the fourth series of comparisons.

15. A method comprising:
capturing a black and white image of an entire surface of a wood product with a first camera, wherein the first camera has a first field of view, and further wherein the first camera captures a black and white image of the wood product at a first location along a conveyor of a production line, the first location being within the first field of view;

capturing a color image of the entire surface of the wood product with a second camera wherein the second camera has a second field of view, the second field of view substantially overlapping with the first field of view, and further wherein the second camera captures a color image of the wood product at the first location, the first location being within the second field of view;

translating the black and white image from the first camera and the color image from the second camera such that the same portion of the wood product captured by each camera is overlaid in a composite view and the images have the same horizontal spacing;

auto-rotating the black and white image such that it has the same orientation as a reference image;

auto-rotating the color image such that it has the same orientation as the reference image;

translating the black and white image such that it has the same horizontal spacing as the reference image;

translating the color image such that it has the same horizontal spacing as the reference image;

determining from computer processing of the black and white image one or more of the dimensions of the wood product, the existence of voids within the wood product, and the presence of debris on the wood product;

determining from computer processing of the color image whether colored defects are present in the wood product; and assigning a grade to the wood product based at least in part on the computer processing of the black and white image and the computer processing of the color image.

16. A method according to claim 15, further comprising determining a scaling factor between the wood product and one of the black and white image or the color image based at least in part on known dimensions of the reference image.

17. A method according to claim 15, wherein the first camera captures a black and white image of a portion of the wood product without digitally stitching together multiple images and the second camera captures a color image of the portion of the wood product without digitally stitching together multiple images.

18. An apparatus comprising:
a first camera to capture a black and white image of an entire surface of a wood product wherein the first camera has a first field of view, and further wherein the first camera captures a black and white image of the wood product at a first location along a conveyor of a production line, the first location being within the first field of view;

a second camera to capture a color image of the entire surface of the wood product wherein the second camera has a second field of view, the second field of view substantially overlapping with the first field of view, and further wherein the second camera captures a color image of the wood product at the first location, the first location being within the second field of view; and a controller to:

translate the black and white image from the first camera and the color image from the second camera such that the same portion of the wood product captured by each camera is overlaid in a composite view and the images have the same horizontal spacing;

perform computer processing of the black and white image to determine one or more of the dimensions of the wood product, the existence of voids within the wood product, and the presence of debris on the wood product;

perform computer processing of the color image to determine whether colored defects are present in the wood product; and assign a grade to the wood product based at least in part on the computer processing of the black and white image and the computer processing of the color image.

19. The apparatus of claim 18, wherein the first and second cameras are mounted above a conveyor of a production line in a position to capture respective black and white and color images of the wood product at the first location of the wood product along the conveyor.

20. The apparatus of claim 18, wherein the controller is configured to determine a scaling factor between the wood product and the black and white image based at least in part on known dimensions of a reference image.

21. The apparatus of claim 18, wherein the controller is configured to auto-rotate the black and white image and the color image such that the black and white image and the color image have the same orientation as a reference image.

22. The apparatus of claim 18, wherein the controller is configured to translate the black and white image and the color image such that the black and white image and the color image are each oriented to match the orientation of the reference image.

* * * * *

UNITED STATES PATENT AND TRADEMARK OFFICE
CERTIFICATE OF CORRECTION

| | | |
|---|---|---|
| PATENT NO. | : 10,825,164 B1 | Page 1 of 1 |
| APPLICATION NO. | : 16/205027 | |
| DATED | : November 3, 2020 | |
| INVENTOR(S) | : David Bolton et al. | |

It is certified that error appears in the above-identified patent and that said Letters Patent is hereby corrected as shown below:

On the Title Page

Item (72), on the line after "Curtis Fennell, Boyce, LA (US)", insert inventor --Jason Matthew Coutee, Pineville, LA (US)--.

Signed and Sealed this
Seventh Day of March, 2023

Katherine Kelly Vidal
*Director of the United States Patent and Trademark Office*